(No Model.)
J. C. MARTIN.
MANUFACTURE OF WHITE LEAD.
No. 296,765. Patented Apr. 15, 1884.
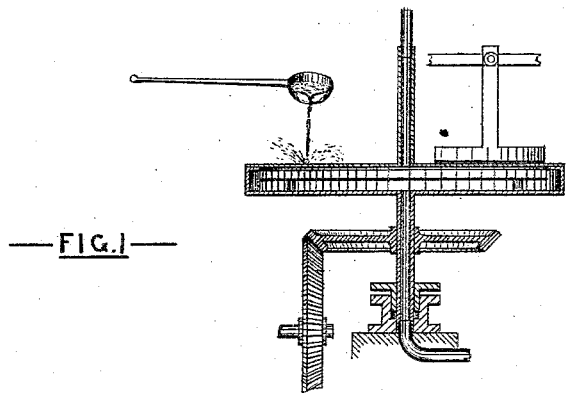
FIG.1
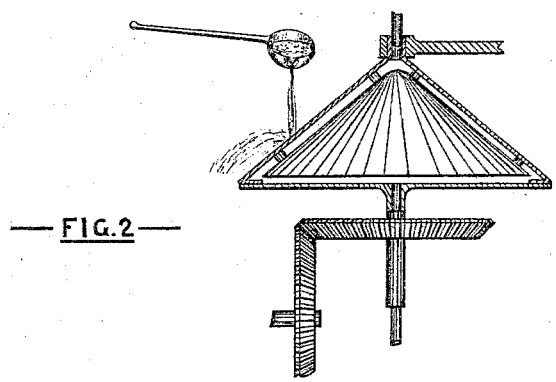
FIG.2
FIG.3
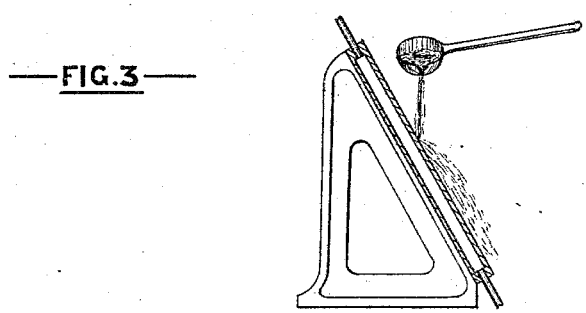
Witnesses
William Henry Beck
Stephen Edward Gunyon
Inventor
John Cowdery Martin

United States Patent Office.

JOHN COWDERY MARTIN, OF RICHMOND, COUNTY OF SURREY, ENGLAND.

MANUFACTURE OF WHITE LEAD.

SPECIFICATION forming part of Letters Patent No. 296,765, dated April 15, 1884.

Application filed December 1, 1882. (No model.) Patented in England March 18, 1879, No. 1,054; in France September 18, 1879, No. 132,767; in Germany September 21, 1879, No. 10,209, and in Belgium September 26, 1879, No. 49,401.

*To all whom it may concern:*

Be it known that I, JOHN COWDERY MARTIN, a subject of the Queen of Great Britain, and residing at Richmond, in the county of Surrey and Kingdom of Great Britain, have invented a certain new and useful Improvement in the Manufacture of Lead Salts for the Production of White Lead, (for which I have obtained Letters Patent in Great Britain, dated March 18, 1879, No. 1,054; in France, dated September 18, 1879, No. 132,767; in Belgium, dated September 26, 1879, No. 49,401, and in Germany, dated September 21, 1879, No. 10,209;) and I do hereby declare that the following is a full, clear, and exact description of the invention, which will enable others skilled in the art to which it appertains to make and use the same, reference being had to the accompanying drawings, and to the letters or figures of reference marked thereon, which form a part of this specification.

These improvements are founded upon those described in the specification of former Letters Patent granted to me in England, and dated the 4th day of April, A. D. 1877, No. 1,300, and relate to the production from splashes of lead, formed as hereinafter described, of solutions of lead salts; and for this purpose I dissolve, by means of solvents suitable to produce the desired solutions, very small flakes or splashes of metallic lead or granulated lead, which are formed by dropping thin streams of molten lead upon a cold stationary or moving surface of sufficient hardness to flatten the drops of molten lead as they fall, and which are kept in a wet state. By preference this surface may be formed of cast-iron. In the specification of my former patent I in particular referred to the surface of a hollow cast-iron cylinder as being the form of the surface suitable for being used; but, as is obvious, other forms of surface may be employed, both in a dry state, and, as I have discovered since the date of the said patent, with still greater advantage in a wet state. For example, I use a hollow revolving disk or cone if the surface is to be moved, as illustrated in Figures 1 and 2 of the drawings; or, if stationary, the surface may be raised or inclined, so that it may the more readily throw off the drops of molten lead falling upon it, as illustrated in Fig. 3. I keep these surfaces cool, whether moving or stationary, by means of water caused to pass beneath, through, or behind them. The surfaces should be kept wet by jets or sprays of water falling upon them, or by the occasional immersion of the surfaces into water, for the purpose of producing the aforesaid very small splashes of lead or granulated lead, and, when found necessary, fixed scrapers may be employed to prevent the said splashes of lead or granulated lead from adhering to the moving surfaces, as shown in Fig. 1; or scrapers moved by any suitable means may be used for the same purpose in connection with stationary surfaces. I dissolve the lead reduced to splashes or granulated, as above described, in the ordinary way by causing a solution of acetic or nitrous acid or other suitable solvent to flow over it while freely exposed to the atmosphere upon perforated trays composed of wood or other suitable material; or I agitate it in contact with the solution and with the atmosphere by means of revolving agitators; or I dissolve it in any other convenient manner.

I am aware that metallic lead has before been subdivided by dropping molten metallic lead onto cold surfaces or into water; and I am also aware that solutions of lead salts for the manufacture of white lead have before been made from metallic lead and so subdivided; but, so far as I am aware, such solutions of lead salts have never before been made from very small flakes or splashes of metallic lead produced by dropping melted lead onto wetted surfaces; and therefore .

I claim as novel—

The mode or method of producing solutions of lead salts by dropping molten lead onto stationary or moving wetted surfaces kept wet by jets or sprays of water or by occasional immersion in water, and dissolving the very small flakes or splashes of metallic lead so formed in a solvent, substantially as hereinbefore described.

JOHN COWDERY MARTIN.

Witnesses:
    WILLIAM HENRY BECK,
  139 *Cannon Street, London.*
    STEPHEN EDWARD GUNYON,
  13 *Farleigh Road, Stoke Newington, London.*